Patented June 26, 1951

2,558,285

UNITED STATES PATENT OFFICE 2,558,285

PREPARATION OF PARA-TERTIARY AMINO AROMATIC ALDEHYDES

Cyril D. Wilson, Metuchen, N. J., assignor to E. I. du Pont de Nemours & Company, Wilmington, Del., a corporation of Delaware No Drawing. Application July 26, 1947, Serial No. 764,030

3 Claims. (Cl. 260—576)

This invention relates to the preparation of tertiary amino aromatic aldehydes. More particularly, it relates to the preparation of such aldehydes which have at least two benzene radicals each containing an aldehyde group.

An object of this invention is to provide a new process for preparing tertiary amino aromatic aldehydes. Another object is to provide such a process using simple and available reactants. Another object is to provide such a process which can be easily controlled and results in good yields. A still further object is to provide such a process which can be carried out in ordinary laboratory apparatus.

It has been found that tertiary amino aromatic aldehydes can be made by reacting a tertiary amine having two to three benzene rings attached to the amino nitrogen atom with a lower dialkyl formamide in the presence of a chloride or oxychloride of sulfur or phosphorus. The dialkyl formamide reacts readily under such conditions and gives a good yield of p-tertiary aminobenzaldehydes. The tertiary aromatic amines may be substituted by hydrocarbon radicals but should be free from such substituents in the benzene ring which are in the para position to the amino nitrogen atom. During the reaction a carbonyl group enters the para position to the nitrogen atom in each benzene nucleus present in the compound resulting in an aldehyde group being introduced at this point. It is advisable to have about two mols of dialkylformamide present per phenyl radical so that a polyaldehyde is formed.

The reaction takes place over a fairly wide range of temperature and pressure conditions. Atmospheric, sub-atmospheric and super-atmospheric pressures, for instance, can be used at temperatures varying from about 30° to 180° C. and higher. It is generally advisable to keep the tertiary aromatic amine cool and then add slowly the dimethyl formamide and the chloride or oxychloride of sulfur or phosphorus. After the components have been mixed, the temperature may then be slowly raised by heating and the reaction completed. An exemplary procedure follows:

A tertiary aromatic amine of the formula

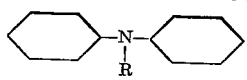

where R is a hydrocarbon radical of 1 to 6 carbon atoms being alkyl or phenyl. Thus alkyl may be methyl, ethyl, propyl, butyl, pentyl, or hexyl. The tertiary aromatic amine is added to a reaction vessel. The reaction vessel is immersed in an ice bath or cooled by equivalent means. For each aromatic hydrocarbon radical attached to an amino group there is added dropwise one to two mols of dialkyl formamide and a chloride or oxychloride of sulfur or phosphorus with stirring. The dialkyl formamide may be added simultaneously with the chloride or oxychloride, or prior to the addition of the latter compound. The amount of chloride or oxychloride may vary over a very wide range but it is generally advisable to use enough to have a solvent or diluent effect on the reactants. From 1 to 3 mols of the former per mol of dialkyl formamide is a practical range. In fact, it is preferable to first admix the tertiary aromatic amine with the dialkyl formamide and then slowly add the aforesaid chloride or oxychloride. The mixture is then warmed on a steam bath for one hour and allowed to stand overnight at room temperature. The resulting solution is poured into cracked ice and neutralized with an alkaline solution, e. g., 20% aqueous sodium hydroxide. If the aldehyde reaction product crystallizes at this point, it is filtered and recrystallized from a suitable solvent. If no crystallization takes place, the product is taken up in ether, dried over sodium sulfate, and distilled at reduced pressure.

The invention will be further illustrated by the following examples. The parts are by weight.

Example I

Eight and two-tenths (8.2) parts of triphenylamine was reacted with ten parts of dimethyl formamide in the presence of 42 parts of phosphorus oxychloride by mixing the first two reactants and adding the latter dropwise with stirring while cooling the reaction vessel in an ice bath. The reaction mixture was then warmed for about one and one-half hours on a steam bath, poured into cracked ice, and neutralized with 20% sodium hydroxide and filtered off. The trialdehyde, namely p,p',p''-triformyl-triphenylamine, was washed with water and had a melting point of 127° C. A nitrogen analysis was run showing 4.24% of nitrogen as compared with the theory of 4.25%.

Example II

Eighteen and three-tenths (18.3) parts of methyl diphenylamine were reacted with 20 parts of dimethyl formamide in the presence of 84 parts of phosphorus oxychloride by mixing the first two reactants and adding the latter dropwise with stirring while cooling the reaction vessel in an ice bath. The resulting mixture was warmed on a steam bath for one and one-half hours and then poured onto cracked ice. Methyl-di-(p-formylphenyl)amine was recovered by neutralizing with 20% sodium hydroxide, filtering, and washing with water. It was recrystallized from hexane. It had a melting point of 90° C.

The sodium sulfate used in the above examples for drying the ethereal solutions, etc. was of the anhydrous type.

In place of the specific amines described above, there may be used in like manner any tertiary aromatic amine having the above formula. Suitable additional amines include N-ethyl diphenylamine, N-isopropyl diphenylamine, N-butyldiphenylamine, N-pentyl diphenylamine, N-hexyl diphenylamine, m-m'-p'''-tritolylamine, etc.

Instead of using phosphorus oxychloride, there may be substituted in the above examples similar amounts of phosphorus trichloride, thionyl chloride, sulfuryl chloride or sulfur dichloride. Amounts from a small fraction of a mol, e. g., one-half to several mols of such compounds can be used per mol of dialkyl formamide.

Similarly, in place of dimethylformamide, there may be substituted other lower dialkyl-formamides having from 1 to 5 carbon atoms in the alkyl groups. Additional compounds of this type are N,N-diethylformamide, N,N-dipropyl-formamide and N,N-diamylformamide.

The present invention has the advantage that it enables the chemist to prepare an entire class of tertiary aromatic amino polyaldehydes by a relatively simple and easily controllable manner. The new tertiary aromatic amino polyaldehydes have considerable utility and can be used to prepare new dyes and other chemicals including styryl dyes. A further advantage of the invention resides in the fact that commercially available reactants or reactants that can readily be prepared can be used.

This application is a continuation-in-part of my application Serial Number 581,939 filed March 9, 1945, now Patent Number 2,437,370.

As many apparently widely different embodiments of this invention may be made without departing from the spirit and scope thereof, it is to be understood that the invention is not limited to the specific embodiments thereof except as defined in the appended claims.

What is claimed is:

1. A p-tertiary amino aldehyde of the formula

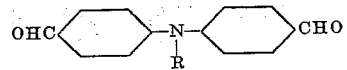

where R is a hydrocarbon radical taken from the group consisting of alkyl radicals of 1 to 6 carbon atoms, phenyl and aldehydrophenyl.

2. The p-tertiary amino aldehyde of the formula

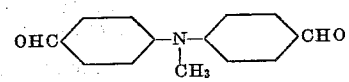

3. A p-tertiary amino aldehyde of the formula

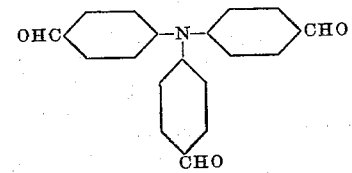

CYRIL D. WILSON.

REFERENCES CITED

The following references are of record in the file of this patent:

UNITED STATES PATENTS

| Number | Name | Date |
|---|---|---|
| 2,141,090 | Muller | Dec. 20, 1938 |
| 2,187,328 | Richter | Jan. 16, 1940 |
| 2,437,370 | Wilson | Mar. 9, 1948 |

FOREIGN PATENTS

| Number | Country | Date |
|---|---|---|
| 17,135 | Great Britain | 1898 |

OTHER REFERENCES

Vilsmeier et al.: Ber. deut. Chem., 60, 119–122 (1927).